United States Patent [19]
Newlin

[11] Patent Number: 5,737,163
[45] Date of Patent: Apr. 7, 1998

[54] DC-AC CONVERTER PROTECTION

[75] Inventor: Trevor Newlin, Livingston, Scotland

[73] Assignee: Burr-Brown Corporation, Tucson, Ariz.

[21] Appl. No.: 665,260

[22] Filed: Jun. 17, 1996

[51] Int. Cl.⁶ .................................................. H02H 7/122
[52] U.S. Cl. .............................. 361/18; 361/86; 307/129; 307/130; 363/55
[58] Field of Search .................... 361/35, 18, 78, 361/86; 363/55–56; 307/116, 129, 130

[56] References Cited

U.S. PATENT DOCUMENTS

| | | | |
|---|---|---|---|
| 3,371,248 | 2/1968 | Schatz | 361/18 |
| 3,373,341 | 3/1968 | Wattson | 323/277 |
| 3,678,368 | 7/1972 | Popp | 363/17 |
| 4,241,372 | 12/1980 | Sears | 361/72 |
| 4,327,406 | 4/1982 | Ashley | 363/56 |
| 4,447,841 | 5/1984 | Kent | 361/18 |
| 4,459,630 | 7/1984 | Beck | 361/18 |
| 4,855,858 | 8/1989 | Boertzel et al. | 361/18 |
| 5,457,591 | 10/1995 | Mock et al. | 361/18 |

*Primary Examiner*—Fritz Fleming
*Assistant Examiner*—Michael Sherry
*Attorney, Agent, or Firm*—N. Stephan Kinsella; James W. Bolcsak

[57] ABSTRACT

A method and apparatus for protecting a DC-AC converter having a transformer. According to one embodiment, an oscillator generates a periodic signal having a frequency. A switch switches an input voltage across a first winding of the transformer in accordance with the periodic signal. A watchdog device disables the switch if the frequency falls below a threshold frequency.

21 Claims, 6 Drawing Sheets

DC-AC CONVERTER PROTECTION

BACKGROUND OF THE INVENTION

1. Field of the Invention

The present invention relates to the DC-AC converters, and, in particular, to protecting the transformer of the DC-AC converter portion of DC-DC converters.

2. Description of the Related Art

This invention relates to the protection of DC-AC converters. DC-AC converter devices are used in a variety of applications, such as in DC-DC conversion circuits, which are used for DC isolation or other purposes. In a DC-AC converter, a DC input voltage from an input DC power supply is applied via a switching means to one winding of a transformer. The switching means switches the input voltage to the transformer winding at a certain frequency, which is supplied by an oscillator circuit connected to or incorporated in the switching means. A square wave output voltage at the oscillator circuit frequency is produced at the output of the second winding of the transformer. This square wave may be rectified to provide a regulated output DC voltage. The switching means may comprise switching (or "drive") transistors controlled by the oscillator circuit. The combination of oscillator and switching circuit is sometimes referred to as a "chopper" or chopping device.

Various events can occur that cause damage to various parts of the DC-AC converter, including the transformer and other elements such as the switching transistors and the input DC power supply. For example, drawing too great an amount of current from the DC input voltage source can damage the switching transistors, the transformer, and/or the voltage source. One cause for such an event may be a stopped oscillator circuit. If the oscillator freezes for some reason when the DC input voltage is connected to a winding or portion of the winding of the transformer, the winding of the transformer can quickly saturate with current and effectively short circuit the input DC power supply. Applying a DC voltage to a transformer for too long can thus destroy the transformer and cause other damage. Excess current through various elements of such a system may result from other causes as well.

It is known to provide protection for such events and excess current by various techniques. In one technique, the transformer of the converter is AC coupled by inserting external capacitors between the switching transistors and the transformer, to eliminate the DC path between the voltage source and the transformer winding. However, such capacitive coupling can cause loss of input voltage and poor reliability due to overstress caused by high currents. In another approach, a current sensor may be used to limit the current switched by the switching transistors. Unfortunately, however, sensing currents can affect start-up times due to additional resistance in the circuit. Other techniques include thermal shutdown units, which require the conversion circuitry to rise to a certain temperature before switching off the circuitry, at which point damage may have already occurred to the circuit.

The DC voltage source may also contain a current limiting device. In this case, the external current limit of the voltage source may be relied on by, for example, using a very thick wire in the transformer, to ensure that the conversion circuitry is able to handle the maximum current that the DC voltage source can produce. Use of heavy gage transformer wire and other such modifications to the conversion circuitry are often impractical, expensive, or otherwise problematic or undesirable.

There is, therefore, a need for improved apparatuses and methods for protecting DC-AC converters.

SUMMARY

There is provided herein an apparatus and method for protecting a DC-AC converter having a transformer. According to one embodiment of the invention, an oscillator generates a periodic signal having a frequency. A switch switches an input voltage across a first winding of the transformer in accordance with the periodic signal. A watchdog device disables the switch if the frequency falls below a threshold frequency.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

The present invention comprises an apparatus and method for protecting a DC-AC converter circuit having a transformer, switching means, and oscillator means. A watchdog circuit or other suitable means is used to monitor the oscillator circuit, which is used to alternatively connect and disconnect an input DC voltage, with the switching means, to the primary winding of the transformer. The watchdog monitors the oscillator and takes control of the switching means from the oscillator circuit to disconnect the input voltage from the transformer winding if the oscillator circuit's output frequency falls below a predetermined threshold frequency for more than a predetermined time. If the output frequency of the oscillator rises back above the threshold frequency for more than a predetermined time, the oscillator takes control of the switching means again. The present invention is described in further detail hereinbelow.

Figure 1:
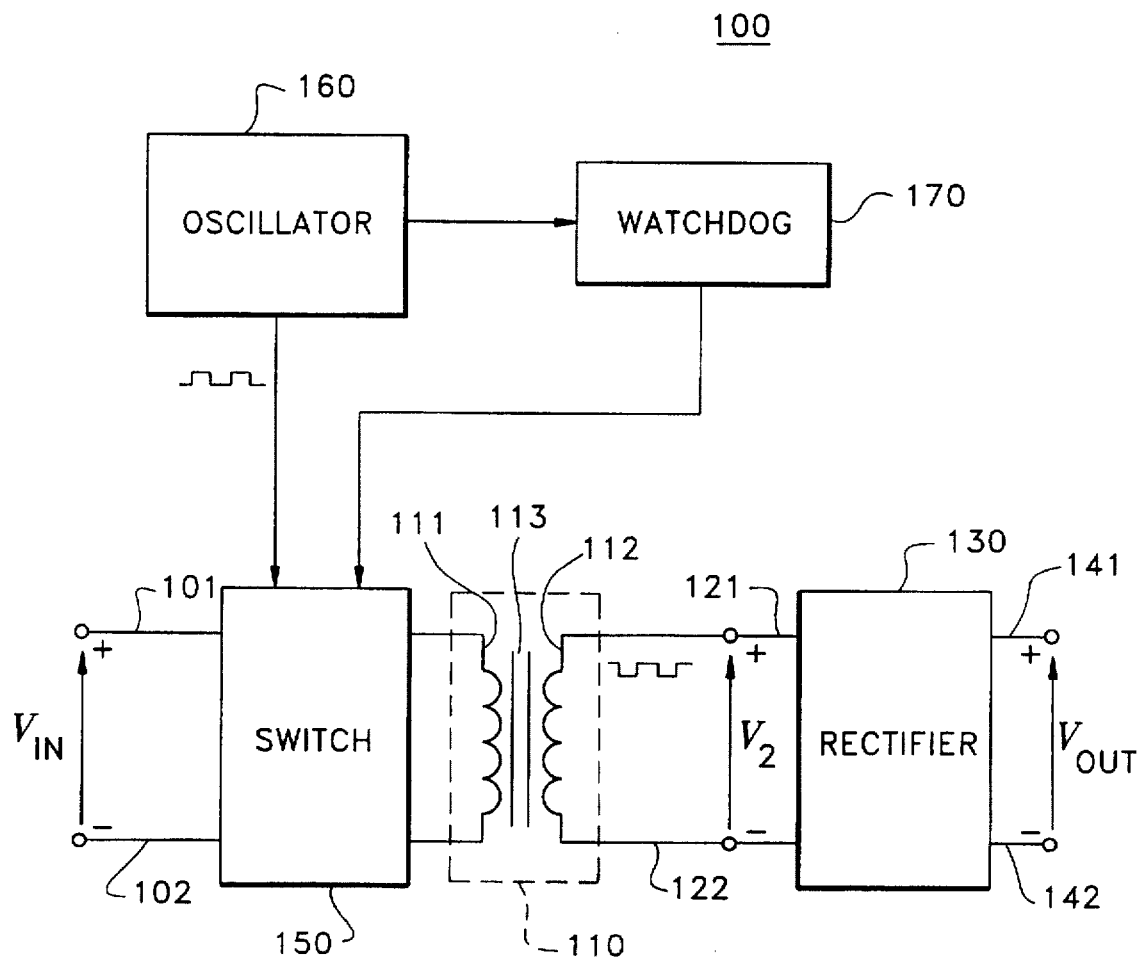
FIG. 1 is a DC-DC converter circuit, having protection circuitry according to a preferred embodiment of the present invention.

Referring now to FIG. 1, there is shown DC-AC converter circuit 100, having converter protection circuitry 160, 170 according to a preferred embodiment of the present invention. In circuit 100, a transformer 110 is used, with switching means 150 and oscillator 160, to connect and disconnect an input voltage $V_{IN}$ at terminals 101, 102 to the primary winding 111 of transformer 110. Transformer 110 also comprises core 113 and secondary winding 112. Oscillator circuit 160 generates a suitable periodic signal of a selectable or predetermined frequency, such as a square wave, which is used to control switching means 150. In various suitable embodiments, switching means 150 may switch in response to every edge transition of the oscillator signal, in response only to every negative edge transition, in response to the absolute level (high or low) of the oscillator signal, and the like. In a preferred embodiment of the present invention, switching means 150 switches each time the oscillator signal provides a negative transition, i.e. from high to low.

Figure 2:
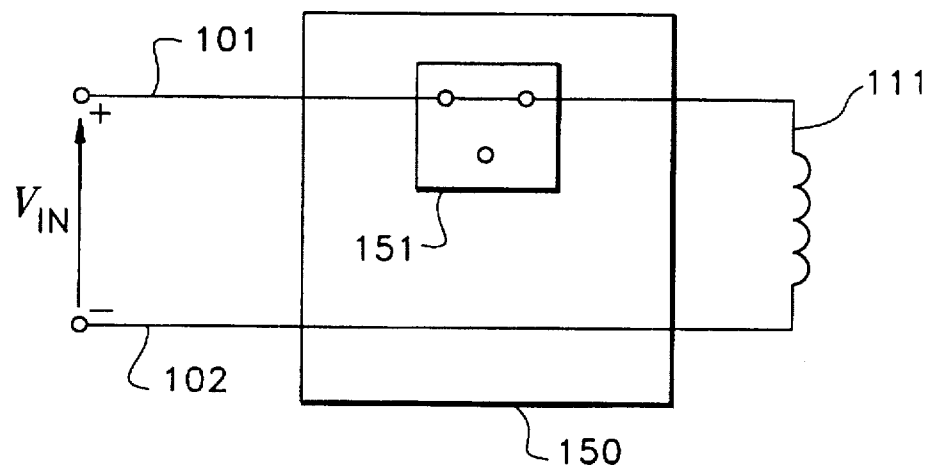
FIG. 2 is a more detailed view of the switching means of the circuit of FIG. 1.
Figure 3:
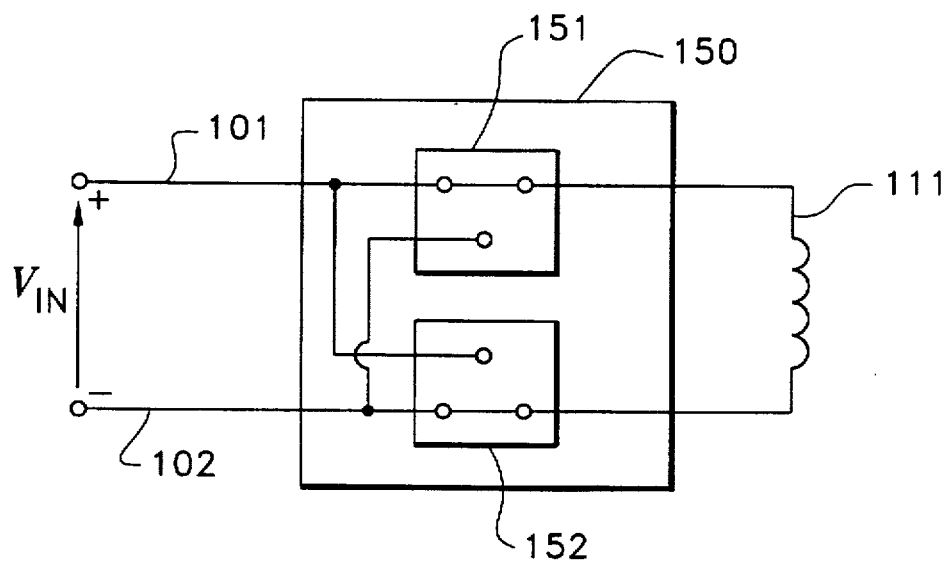
FIG. 3 is a more detailed view of an alternative switching means of the circuit of FIG. 1.

Oscillator circuit 160 may include a normal oscillator stage and a divide by two stage, or it may include only the normal oscillator stage. Oscillator circuit 160 may also have a "sync" pin that allows it to be tied to and thus synchronized with other oscillator circuits. Switching means 150 may toggle terminals 101 and 102 with switch 151, in one embodiment, to either connect $V_{IN}$ to winding 111 or to an open circuit connection, as illustrated in FIG. 2. As will be appreciated, in alternative embodiments switch 151 may be coupled in series with "low side" line 102, which may be ground coupled, instead of to line 101. Referring to FIG. 3, there is shown an alternative means of switching terminals 101 and 102, such that terminals 101 and 102 are alternately applied to opposite ends of primary winding 111 with switches 151 and 152, as illustrated. As will be appreciated, in alternative embodiments one terminal such as terminal 101 may be coupled to a center tap node of winding 111 and terminal 102 may be switched by a switching means back and forth from opposite ends of winding 111.

Oscillator 160 causes switch 150 to toggle back and forth at the oscillator frequency. Transformer 110 therefore outputs on secondary winding 112 voltage $V_2$, which has a square wave shape. As will be appreciated, the root-mean square (RMS) magnitude of $V_2$ may be equal to, greater, or less than the magnitude of $V_{IN}$, depending on the ratio of turns of windings 111 and 112, on the duty cycle of the signal generated by oscillator 160, and on the means of connecting and switching terminals 101 and 102 to primary winding 111. Voltage $V_2$ may be rectified by rectifier 130 to provide an output DC voltage $V_{OUT}$, as illustrated in FIG. 1. As will be understood, the magnitude of $V_{OUT}$ may also be equal to, greater, or less than the magnitude of $V_{IN}$. In some DC-AC converter configurations such as circuit 100, DC isolation is provided between $V_{IN}$ and $V_{OUT}$ since there is no ground in common. Circuit 100 may be one of a plurality of DC-DC converter circuits situated physically near one another and each coupled to $V_{IN}$.

When oscillator 160 is not operating normally and fails to generate a suitable output frequency, switch 150 will not toggle back and forth sufficiently, and may cause damage to switches in switching means 150, to the power supply supplying $V_{IN}$, and/or to transformer 110, as explained above. For example, if oscillator 160 stops when switching means 150 is connecting terminal 101 to primary winding 111 and thus is connecting $V_{IN}$ across winding 111, winding 111 may effectively short circuit the input voltage source, thereby destroying winding 111 or causing other damage. Such damage may also occur if oscillator 160 does not completely stop but slows down so that $V_{IN}$ is connected across winding 111 for too long for a given cycle.

When oscillator 160 fails to generate an output frequency sufficient to prevent such damage from occurring, watchdog 170 overrides oscillator 160's control of switching means 150 and disables the switching means such that $V_{IN}$ is not harmfully applied to primary winding 111. In one embodiment, switching means 150 comprises one or more drive or switching transistors, whose outputs are connected to winding 111. In such an embodiment, when watchdog 170 detects that the output frequency of oscillator 160 is below a threshold frequency, watchdog 170 provides a signal to switching means 150 that causes the switching transistors' outputs to tristate. Alternatively stated, if a time out period occurs before the next oscillator signal transition is received, watchdog 170 tristates and thus disables switching means 150. As will be understood, when a longer time occurs between successive oscillator pulses or transitions, the frequency of the oscillator signal may be considered to have fallen.

In a further embodiment, if the output frequency of oscillator 160 again rises above the threshold frequency, then watchdog 170 removes its control of switching means 150, allowing it to switch as normal in accordance with the output frequency of oscillator 160. This function may be implemented by having watchdog 170 enable switching means 150 again as soon as another oscillator transition is received. Alternatively, watchdog 170 may perform this function by enabling the switching means if the output signal of oscillator 160 rises above the threshold frequency (or a second threshold frequency) for more than the time out period (or a second time out period).

As will be understood, in circuit 100 as illustrated in FIG. 1, switching means 150 disconnects and connects one terminal of voltage $V_{IN}$ so that winding 111 receives $V_{IN}$ or no voltage, alternately. As will be appreciated, however, in alternative preferred embodiments of the present invention, input voltage $V_{IN}$ may be applied by an appropriate switching means to winding 111 by reversing its polarity so that the voltage across winding 111 is either $V_{IN}$ or $-V_{IN}$. Further, although the embodiment illustrated in circuit 100 is not shown as using the center tap nodes of either winding 111 or 112, those skilled in the art will understand that the center tap or other tap nodes of either or both winding 111 or 112 may be utilized without departing from the principle and scope of the present invention. As will be appreciated, in any of these embodiments an input DC voltage $V_{IN}$ is connected and disconnected to a transformer at a certain frequency such that a square wave voltage is produced at the output of the transformer winding.

As will further be understood, in one embodiment oscillator circuit 160 generates a suitable periodic signal of a selectable or predetermined frequency, such as a square wave, which is used to control switching means 150. In other embodiments oscillator circuit may generate other types of signals, such as sawtooth waves or periodic pulses, where switching means 150 is configured to switch accordingly. For example, switching means 150 may be configured to switch with the peaks and/or troughs of sawtooth waves.

Figure 4:
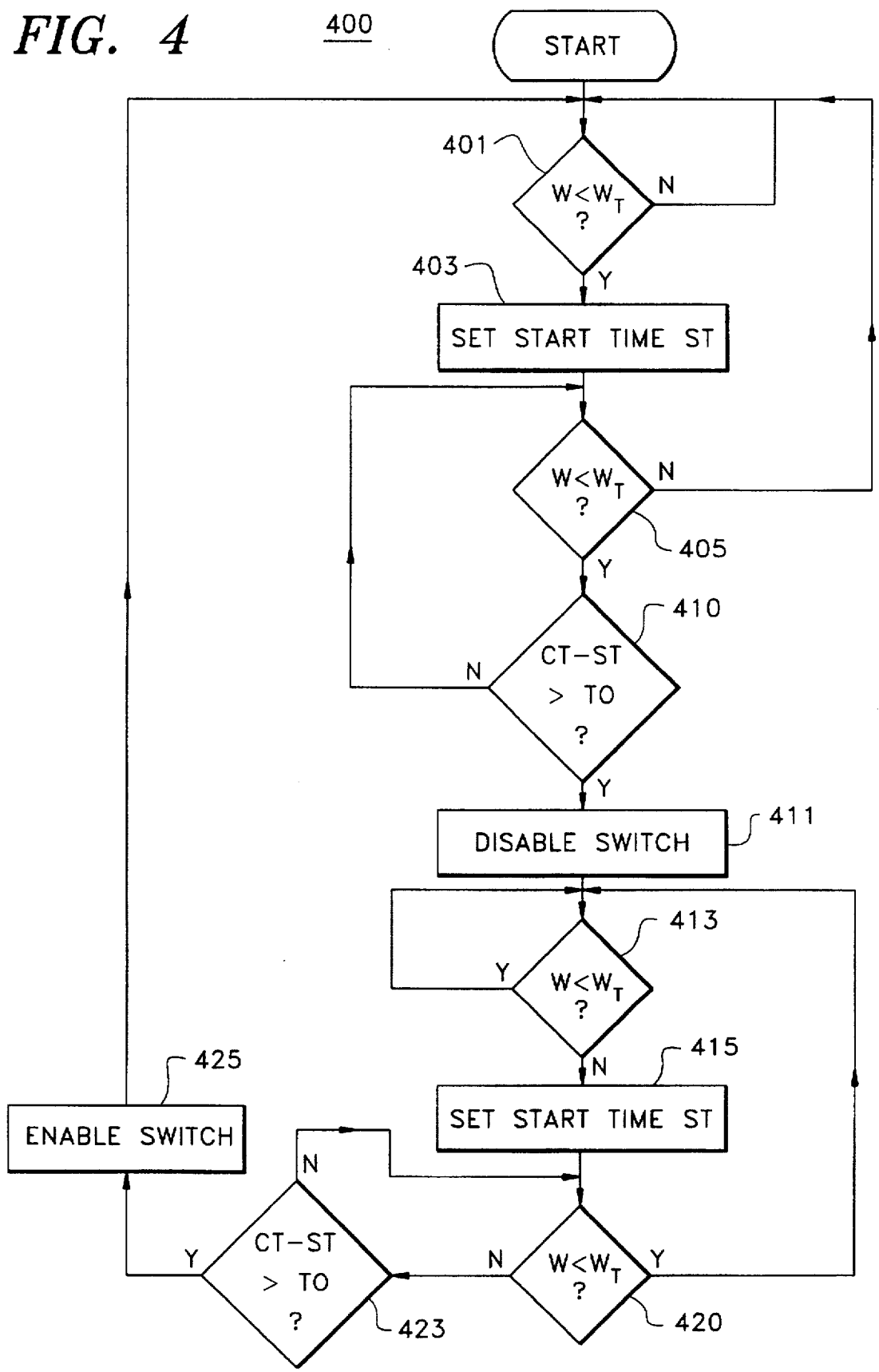
FIG. 4 is a flow chart of the method of operation of the DC-AC converter protection circuit of FIG. 1.

Referring now to FIG. 4, there is shown a flow chart 400 of the method of operation of an embodiment of circuit 100 of FIG. 1. Watchdog 170 monitors the frequency ω output by oscillator 160 (step 401 of FIG. 4). If measured frequency ω is above a threshold frequency $ω_T$, watchdog 170 continues monitoring ω (step 401). Otherwise, a start time ST is set at the current time (step 403), and ω is again compared to $ω_T$ (step 405). If ω is above $ω_T$, then step 401 is returned to since ω has risen back above $ω_T$ before the time out period has elapsed. If ω is still below $ω_T$ (step 405), then if time out TO has elapsed since the start time ST (step 410), switching means 150 is disabled (step 411). Otherwise, if TO has not elapsed, step 405 is returned to.

Once switching means 150 has been disabled, watchdog 170 monitors frequency ω and enables switching means 150 if ω rises above $ω_T$ for the time out period. As long as ω is below $ω_T$, watchdog continues to monitor ω (step 413). If ω rises above $\omega_T$ (step 413), then a start time ST is set again (step 415), and if $\omega$ stays at or above $\omega_T$ for more than the time out TO (steps 420, 423), then switching means 150 is once again enabled (step 425) and watchdog 170 continues to monitor oscillator 160 for insufficient frequency output $\omega$ (steps 425, 401).

An alternative description of the operation of an embodiment of circuit 100 is as follows. Watchdog 170 monitors the oscillator signal output by oscillator 160, and resets a timer each time a negative transition occurs in the oscillator signal. If the timer reaches time out before another negative transition is received, switching means 150 is disabled, where the length of the time out period corresponds to the maximum acceptable oscillator frequency $\omega_T$. As soon as another negative transition occurs in the oscillator signal, switching means 150 is once again enabled and the timer of watchdog 170 is reset again. Thus, switching means 150 is disabled whenever the oscillator signal frequency is below $\omega_T$, or, equivalently, the switching means is disabled whenever the duration between oscillator signal transitions exceeds the cycle period corresponding to $\omega_T$.

Figure 5:
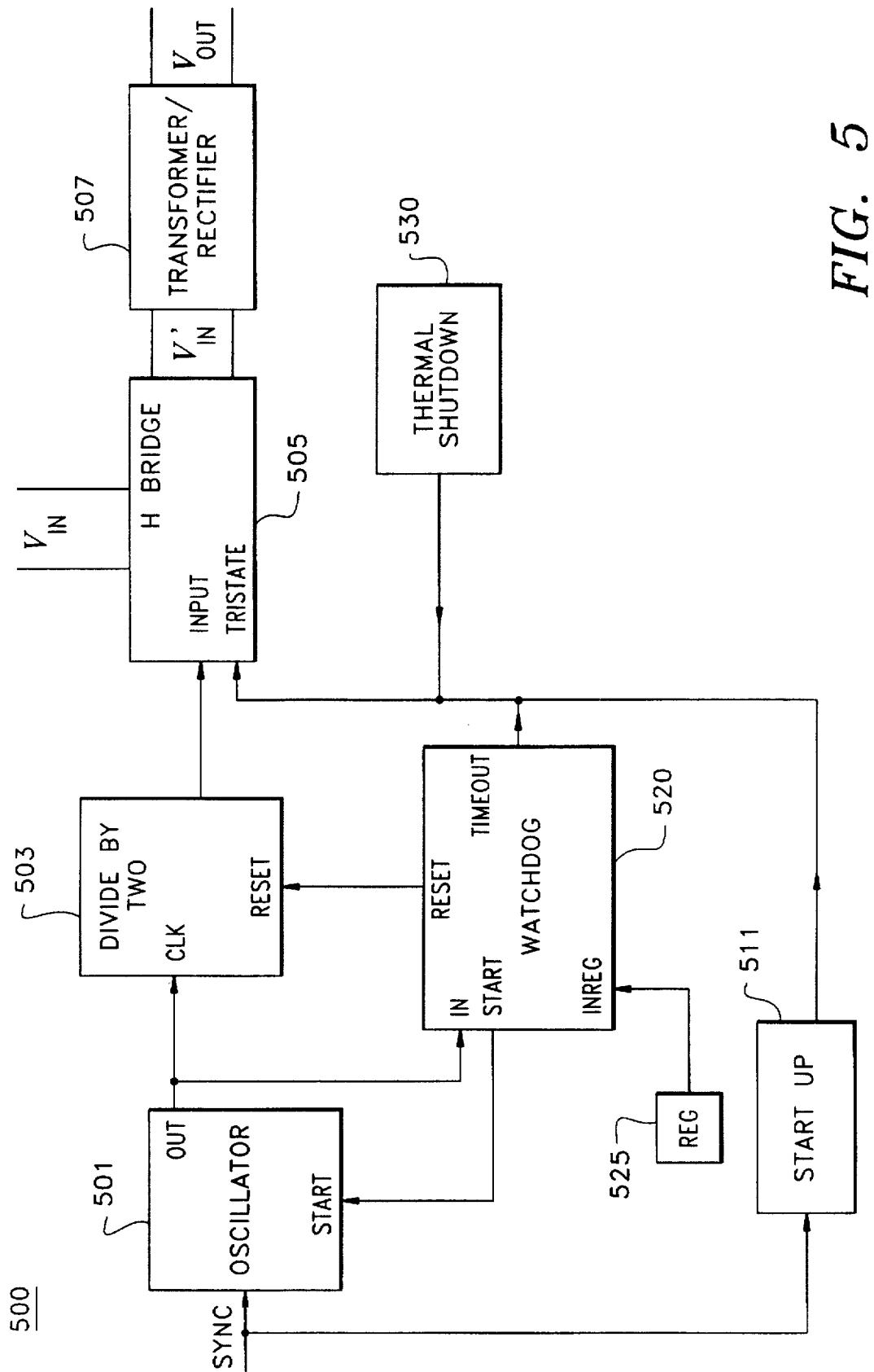
FIG. 5 is an alternative DC-DC converter circuit, having protection circuitry according to a preferred embodiment of the present invention.

Referring now to FIG. 5, there is shown an alternative DC-DC converter circuit 500, having protection circuitry according to a preferred embodiment of the present invention. As illustrated in FIG. 5, circuit 500 comprises oscillator 501, divide by two circuitry 503, watchdog 520, H bridge 505, transformer/rectifier 507, start up circuitry 511, voltage regulator 525, and thermal shutdown device 530. As will be appreciated, H bridge 505 receives an input DC voltage $V_{IN}$, which is switched in accordance with an oscillating frequency received at its input from divide by two circuit 503, to provide $V'_{IN}$, as illustrated. Input voltage $V_{IN}$ is switched across the primary winding of transformer/rectifier 507 to provide $V_{OUT}$, a DC voltage, as similarly described with respect to the DC-DC conversion of circuit 100 of FIG. 1. Voltage regulator (labeled "reg") 525, also known as a "bandgap" device, provides a regulated power supply voltage that may be used to drive circuitry components of circuit 500, such as oscillator 501, divide by two 503, and watchdog 520. Voltage regulator or bandgap 525 may provide a signal to the "inreg" pin of watchdog 520 that enables watchdog 520 once the supply voltage provided by the voltage regulator has stabilized and reached the desired level. In one embodiment, the supply voltage provided by voltage regulator 525 is 3.5V.

H bridge 505 comprises at least one drive or switching transistor (not shown) that may be tristated in accordance with the signal appearing at the tristate input to the H bridge, as will be appreciated. When the drive transistors are tristated, $V_{IN}$ is no longer connected to transformer/rectifier 507, i.e. $V'_{IN}$ is zero. When the tristate input to H bridge 505 is not enabled, H bridge 505 switches $V_{IN}$ across the primary winding of transformer/rectifier 507 in accordance with the oscillating frequency received at its input from divide by two 503. As will be understood, in various embodiments $V_{IN}$ is switched across the primary winding of transformer/rectifier 507 by appropriate center-tap connection, in push-pull configuration, or by another suitable configuration.

Thermal shutdown 530 tristates the drive transistors of H bridge 505 when excess heat is detected. Thus, thermal shutdown serves as one means for protecting some or all of circuitry 500 when it is overheating for some reason, such as excess current flowing through a drive transistor of H bridge 505.

Oscillator 501 generates a periodic signal, such as a square wave, of frequency $2\omega$. This signal is coupled to divide by two 503 and also to watchdog 520, as illustrated. As previously described, in alternative embodiments the output of oscillator 501 may be a periodic signal other than a square wave, such as a sawtooth wave. Divide by two circuitry 503 outputs a periodic signal, such as a square wave, having frequency $\omega$. As will be understood, one purpose of divide by two circuitry 503 may be to equalize the mark:space ratio of the periodic signal used to toggle H bridge 505. The "sync" or synchronization signal may be used to synchronize oscillator 501 with other converter circuits (not shown), and with start up circuitry 511 upon start up, as will be appreciated.

Figure 6:
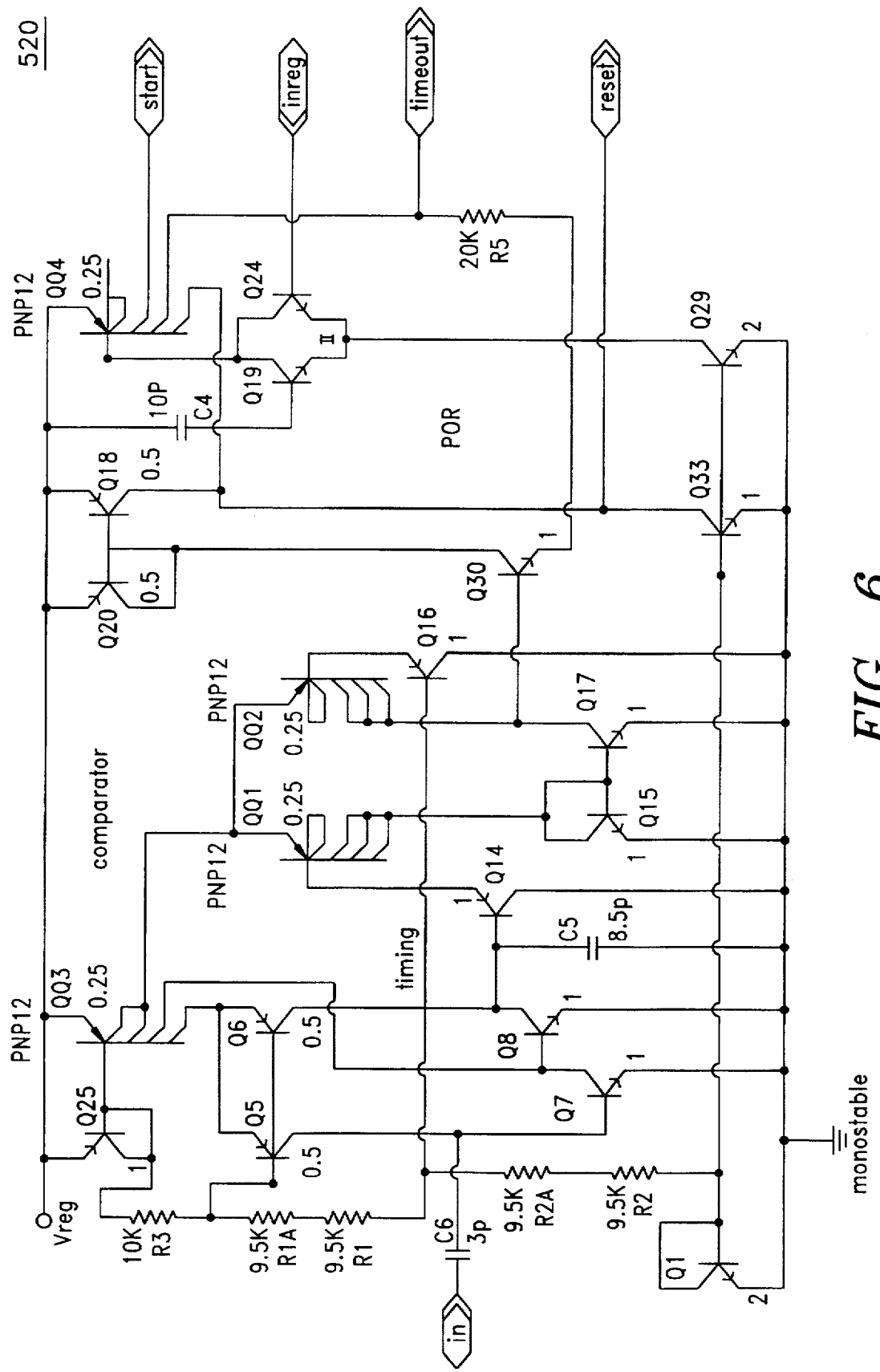
FIG. 6 illustrates the watchdog circuit of the circuit of FIG. 5 in further detail.

Referring now to FIG. 6, there is shown watchdog circuit 520 of circuit 500 of FIG. 5 in further detail. Watchdog 520 comprises pins labeled "in," "start," "inreg," "timeout," and "reset," and terminal "vreg," which is coupled to a suitable voltage source, preferably the regulated supply voltage generated by voltage regulator 525 of FIG. 5. Watchdog 520 further comprises a variety of interconnected elements including capacitors, transistors, and resistors. In particular, watchdog circuit 520 comprises resistors $R_3$, $R_{1A}$, $R_1$, $R_{2A}$, $R_2$, and $R_5$, with resistance in ohms as shown; for example, the resistance of resistor $R_3$ is 10 k$\Omega$. Watchdog 520 further comprises capacitors $C_6$ (having a 3 pF capacitance, as shown), $C_5$, and $C_4$, and transistors $Q_{25}$, $QQ_3$, $Q_5$, $Q_6$, $Q_1$, $Q_7$, $Q_8$, $Q_{14}$, $QQ_1$, $QQ_2$, $Q_{15}$, $Q_{20}$, $Q_{18}$, $Q_{16}$, $Q_{30}$, $Q_{33}$, $Q_{29}$, $Q_{19}$, $Q_{24}$, and $QQ_4$. These circuit components of watchdog 520 are intercoupled as illustrated in FIG. 6. As will be appreciated, the numerical values shown near the collector or emitter of each transistor represent a relative transistor area figure. For example, the relative area of $Q_5$ is 0.5. As will further be appreciated, the notation "$QQ_x$" represents multiple transistors tied together in parallel. Thus, for example, $QQ_3$ comprises four pnp-type transistors, each having relative area 0.25, with their bases coupled together, their emitters coupled together, and with two of their collectors tied together and coupled to $QQ_1$, as illustrated, with the remaining collectors coupled to other components.

As will be appreciated, the function of the pins of watchdog 520 are as hereinafter described. The "in" pin receives the oscillator signal from oscillator 501 via line 502 (FIG. 5). The "reset" pin provides a signal that may be used to reset divide by two circuit 503 via line 504 whenever watchdog 520 detects that the time out period has elapsed since the last oscillator signal transition without another transition being received. When this occurs, watchdog 520 provides a signal on the "timeout" pin to tristate the switching transistors of H bridge 505. In one embodiment, the "timeout" pin is coupled to the bases of one or more npn switching transistors in H bridge 505 having grounded emitters. The "inreg" pin is for receiving a signal from voltage regulator or bandgap 525, as explained previously. As will be appreciated, the signal received on the "inreg" pin of watchdog 520 is low when the supply voltage provided by voltage regulator 525 is sufficient to operate watchdog 520 and other circuitry. The "start" pin may be used to keep oscillator 501 stopped, e.g. once watchdog 520 has disabled H bridge 505 due to the time out period elapsing, as described in further detail below.

Figure 7:
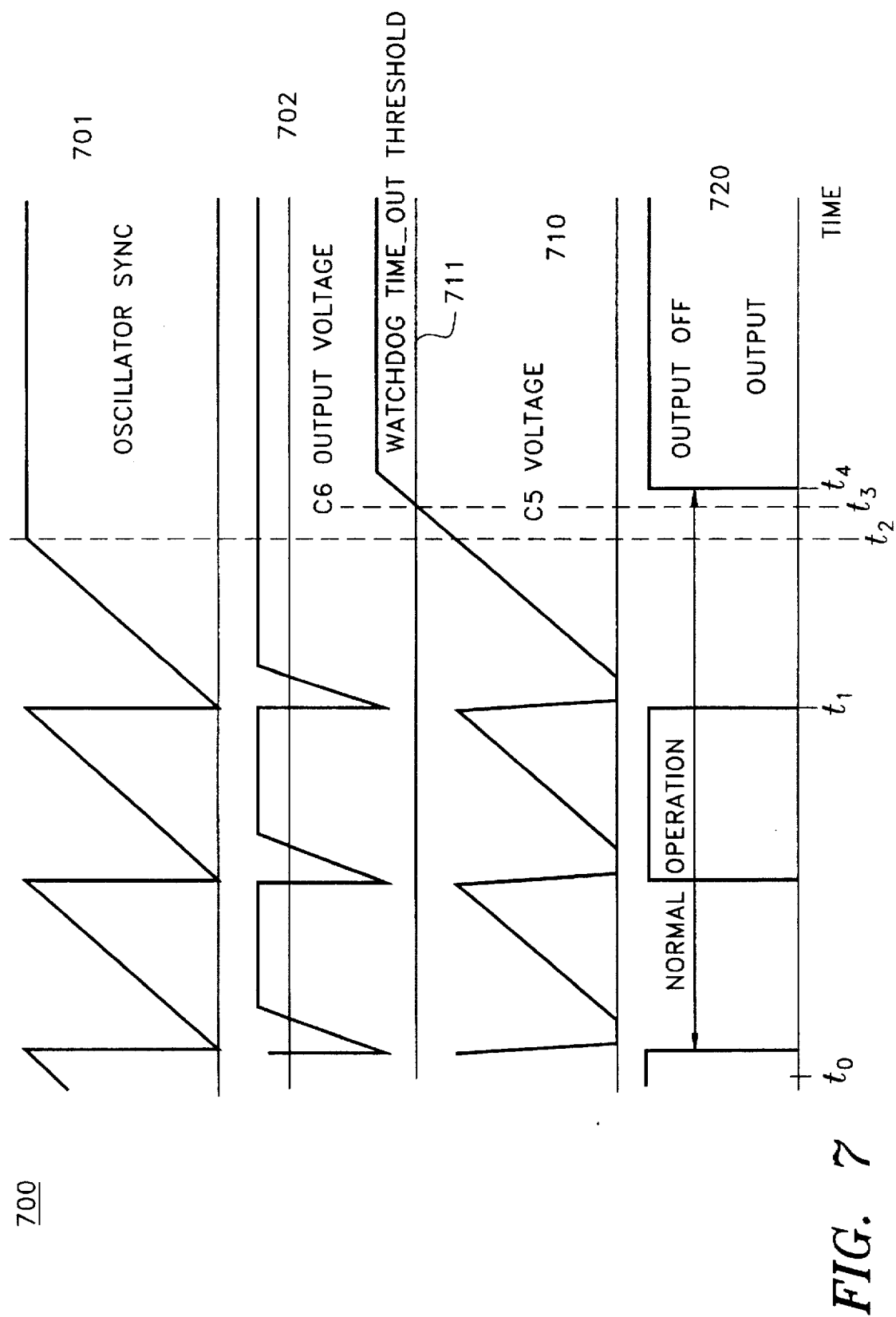
FIG. 7 is a timing diagram with exemplary waveforms of various signals illustrative of the operation of the watchdog circuit of FIG. 6.

Referring now to FIG. 7, there is shown timing diagram 700 showing exemplary waveforms of various signals, not necessarily to scale, illustrative of the operation of watchdog circuit 520. Diagram 700 comprises waveform 701, which shows the oscillator 501 sync; waveform 702, showing the voltage of the node of capacitor $C_6$ of watchdog 520 that is coupled to the base of transistor Q7; waveform 710, showing the voltage across capacitor $C_5$; and waveform 720, showing the state of the switching transistor of H bridge 505. For purposes of timing diagram 700 and waveform 720, it is assumed that H bridge 505 comprises a switching transistor (not shown) that is "low-side" coupled, i.e. that lies in series with the ground connection of the primary winding of the transformer of transformer/rectifier 507, while the top end of the primary winding is coupled to the input voltage $V_{IN}$. It is further assumed that the switching transistor cycles between "on" and "off" each time a negative transition is received from the signal provided by divide by two 503. Thus, for one cycle of the divide by two output signal, the bottom or "low" connection of the primary winding is coupled by the switching transistor to ground, so that $V_{IN}$ is applied to the primary winding; and for the next cycle the low side is open circuited so that $V_{IN}$ is not effectively coupled across the primary winding.

As illustrated in diagram 700, oscillator 501 sync is a sawtooth wave that ramps up and transitions down with a fast falling edge. As will be appreciated, the negative edge of the oscillator sync corresponds to a negative going edge of the oscillator's square wave signal output 502. The sawtooth wave of the oscillator sync is coupled to the "in" pin of watchdog 520.

Normal operation is illustrated in FIG. 7 roughly from time $T_0$ to $T_2$. As shown in waveform 701, at time $T_2$ the oscillator sync (and thus output 502) does not fall as it should. This may be caused by some problem with oscillator 501, or, for example, if oscillator 501 is intentionally stopped by pulling or keeping its sync pin high. By time $T_4$, watchdog 520 has disabled H bridge 505 since oscillator 520 has stopped for too long.

During normal operation, each negative edge of output 502 turns off $Q_7$ of watchdog 520, for the period set by the IC time constant of capacitor $C_6$ and the collector current of $Q_5$. This allows $Q_8$ to be momentarily turned on, which discharges $C_5$. Thus, these elements of watchdog circuit 520 function as an edge-triggered monostable. Capacitor $C_5$, which functions as a timing capacitor, is then charged by current source $Q_6$. Thus, after each negative edge of oscillator output 502, capacitor $C_5$ begins to charge up from a discharged state, at a constant rate, as shown by the upwardly-rising portions of waveform 710. Watchdog circuit 520 is configured so that if $C_5$ is not discharged again within a sufficient time period it will rise above a threshold voltage 711, thereby causing H bridge 505 to be disabled by tristating its switching transistor(s).

Thus, if no more oscillator pulses occur after the negative edge corresponding to time $T_1$ (or if another negative edge does not occur within a sufficient time), then the voltage of $C_5$ will begin to rise after a short delay after $T_1$, causing the voltage sensed by voltage follower $Q_{14}$ to exceed the threshold voltage set by the $R_1$, $R_2$, $R_3$ combination at time $T_3$. As will be appreciated, time $T_3$ is after the time $T_2$ at which another negative edge of output 502 and the oscillator sync would occur if oscillator 501 were operating normally. $Q_{14}$ and the $R_1$, $R_2$, $R_3$ combination therefore help to form a voltage comparator. Exceeding this threshold voltage causes $QQ_1$ to be turned off and $QQ_2$ to be turned on, which in turn causes the base of $Q_{30}$ to go high, allowing current to flow therethrough to the "timeout" pin of watchdog 520 at $T_4$, a short time after $T_3$. This causes H bridge 505 to be disabled, as described previously, thus the "output off" labeled state of waveform 720. As will be understood by those skilled in the art, the IC time constant of $C_5$ and current source $Q_6$ is selected so that $C_5$ does not reach the turn off voltage of $Q_{14}$ before the next negative going edge of oscillator 501 output 502 discharges $C_5$ again. The current flowing through the collector of $Q_{30}$ is mirrored by the $Q_{20}$, $Q_{18}$ combination with sufficient current to overcome the $Q_{33}$ current source, thereby also causing the "reset" pin of watchdog 520 to go high. This resets divide by two circuit 503, as described previously.

As will be appreciated, the time between time $T_1$ and $T_2$ is a time period corresponding to a normal frequency. The time between time $T_1$ and $T_3$ is a time period corresponding to the previously mentioned threshold frequency $\omega_T$. Thus, the operation of watchdog 520 may be described as disabling H bridge 505 if it detects that the oscillator output 502 has not toggled for longer than a predetermined time out period (here defined as the time between $T_1$ and $T_3$), where the time out period is longer than the period of a normally-functioning oscillator output and preferably sufficient to allow the H bridge to be switched off in time to prevent damage to transformer/rectifier 507. This operation may also be described, as will be understood, as detecting whether the output frequency $2\omega$ of oscillator 501 is below a threshold frequency $\omega_T$.

As will further be appreciated, watchdog 520 comprises a frequency-to-voltage converter means whereby the voltage corresponding to the period of the oscillator signal (and thus inversely related to the oscillator signal frequency) will rise above a threshold voltage when the input signal's frequency falls below a corresponding threshold frequency, i.e. when another input signal transition is not received within a time out period.

During power on of watchdog circuit 520, the "inreg" pin is held high by voltage regulator 525, turning on $Q_{24}$, which turns on $QQ_4$, and prevents current from flowing through $Q_{19}$, so that the voltage across $C_4$ remains low. When voltage regulator 525 has reached its regulation supply voltage, the "inreg" pin goes low, allowing current to flow through $Q_{19}$ and keeping $QQ_4$ on. The base current of $Q_{19}$ charges up $C_4$ until $Q_{29}$ saturates, removing the current from $Q_{19}$ and thus turning off $QQ_4$. This power on reset, with circuit components having values as illustrated, takes approximately 100 µS, in one embodiment. The power on reset outputs ($QQ_4$ collectors) are hard-wire OR'd to the "reset" pin and the "timeout" pin. The $QQ_4$ collectors also provide the "start" pin output signal used to hold oscillator 520 stopped, which can be useful when multiple oscillators are connected together, to cause them to start at the same time. Thus, as will be understood, while inreg is high, watchdog 520 holds the start pin high, which effectively shorts the sync pin of oscillator 501 to ground; holds the timeout signal high, which disables H bridge 505; and holds the reset pin high, which resets divide by two circuit 503.

As will be understood and as described above, the present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments combine with the microprocessor to provide a unique device that operates analogous to Specific logic circuits. For example, the function of watchdog 170 of circuit 100 of FIG. 1, as described in flowchart 400 of FIG. 4, may, in one embodiment, be implemented by a general-purpose or specially-designed microprocessor.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An apparatus for protecting a DC-AC converter having a transformer, the apparatus comprising:
   (a) an oscillator means for generating a periodic signal having a frequency;
   (b) a switching means for switching an input voltage across a first winding of the transformer in accordance with the periodic signal; and
   (c) a watchdog means for disabling the switching means if the frequency falls below a threshold frequency, the watchdog means comprising:
      (1) a frequency to voltage converter means for converting the frequency to a voltage;
      (2) a comparator means for comparing the voltage to a reference voltage corresponding to the threshold frequency; and
      (3) means for disabling the switching means if the voltage rises above the threshold voltage.

2. The apparatus of claim 1, wherein means (c)(1) comprises a timing capacitor, a current source coupled to the timing capacitor for charging the timing capacitor, and discharge means coupled between the periodic signal of the oscillator means and the timing capacitor for discharging the timing capacitor when a transition of the periodic signal is received by the discharge means.

3. The apparatus of claim 1, wherein means (c) further comprises (4) means for enabling the switching means if the frequency rises above a second threshold frequency.

4. The apparatus of claim 3, wherein means (c)(4) comprises means for enabling the switching means if the frequency rises above the second threshold frequency for more than a time out period.

5. The apparatus of claim 4, wherein the threshold frequency is equal to the second threshold frequency.

6. The apparatus of claim 1, wherein means (b) switches the input voltage across the first winding of the transformer in accordance with the periodic signal to provide an output square wave voltage across a second winding of the transformer.

7. The apparatus of claim 1, wherein:
   the switching means comprises at least one switching transistor having an output coupled to the first winding of the transformer; and
   means (c) comprises means for tristating the output of the at least one switching transistor if the frequency falls below the threshold frequency.

8. A method for protecting a DC-AC converter having a transformer, the method comprising the steps of:
   (a) generating with an oscillator means a periodic signal having a frequency;
   (b) switching with a switching means an input voltage across a first winding of the transformer in accordance with the periodic signal; and
   (c) disabling the switching means if the frequency falls below a threshold frequency, wherein step (c) comprises the steps of:
      (1) converting the frequency to a voltage with a frequency to voltage converter means;
      (2) comparing the voltage to a reference voltage corresponding to the threshold frequency; and
      (3) disabling the switching means if the voltage rises above the threshold voltage.

9. The apparatus of claim 8, wherein the frequency to voltage converter means comprises a timing capacitor, a current source coupled to the timing capacitor for charging the timing capacitor, and discharge means coupled between the periodic signal of the oscillator means and the timing capacitor for discharging the timing capacitor when a transition of the periodic signal is received by the discharge means.

10. The method of claim 8, further comprising the step of:
    (d) enabling the switching means if the frequency rises above a second threshold frequency.

11. The method of claim 10, wherein step (d) comprises the step of enabling the switching means if the frequency rises above the second threshold frequency for more than a time out period.

12. The method of claim 11, wherein the threshold frequency is equal to the second threshold frequency.

13. The method of claim 8, wherein step (b) comprises the step of switching the input voltage across the first winding of the transformer in accordance with the periodic signal to provide an output square wave voltage across a second winding of the transformer.

14. The method of claim 8, wherein:
    the switching means comprises at least one switching transistor having an output coupled to the first winding of the transformer; and
    step (c) comprises the step of tristating the output of the at least one switching transistor if the frequency falls below the threshold frequency.

15. An apparatus for protecting a DC-AC converter having a transformer, an oscillator means for generating a periodic signal having a frequency, and a switching means for switching an input voltage across a first winding of the transformer in accordance with the periodic signal, the apparatus comprising:
    (a) means for monitoring the frequency; and
    (b) means for disabling the switching means if the frequency falls below a threshold frequency, wherein means (b) comprises:
       (1) a frequency to voltage converter means for converting the frequency to a voltage;
       (2) a comparator means for comparing the voltage to a reference voltage corresponding to the threshold frequency; and
       (3) means for disabling the switching means if the voltage rises above the threshold voltage.

16. The apparatus of claim 15, wherein means (b)(1) comprises a timing capacitor, a current source coupled to the timing capacitor for charging the timing capacitor, and discharge means coupled between the periodic signal of the oscillator means and the timing capacitor for discharging the timing capacitor when a transition of the periodic signal is received by the discharge means.

17. The apparatus of claim 15, further comprising:
    (c) means for enabling the switching means if the frequency rises above a second threshold frequency.

18. The apparatus of claim 17, wherein means (c) comprises means for enabling the switching means if the frequency rises above the second threshold frequency for more than a time out period.

19. The apparatus of claim 18, wherein the threshold frequency is equal to the second threshold frequency.

20. The apparatus of claim 15, wherein the switching means switches the input voltage across the first winding of the transformer in accordance with the periodic signal to provide an output square wave voltage across a second winding of the transformer.

21. The apparatus of claim 15, wherein:
the switching means comprises at least one switching transistor having an output coupled to the first winding of the transformer; and
means (b) comprises means for tristating the output of the at least one switching transistor if the frequency falls below the threshold frequency.

* * * * *